US012273307B2

(12) United States Patent
Xu et al.

(10) Patent No.: US 12,273,307 B2
(45) Date of Patent: Apr. 8, 2025

(54) METHOD AND APPARATUS FOR DISPLAYING INTERACTION MESSAGE FOR APPLICATION, AND READABLE STORAGE MEDIUM

(71) Applicant: Beijing Bytedance Network Technology Co., Ltd., Beijing (CN)

(72) Inventors: Jiannan Xu, Beijing (CN); Tianyang Gao, Beijing (CN); Hao Wan, Beijing (CN); Xu Xu, Beijing (CN); Daoyu Wang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/055,733

(22) Filed: Nov. 15, 2022

(65) Prior Publication Data

US 2023/0076754 A1 Mar. 9, 2023

Related U.S. Application Data

(63) Continuation of application No. PCT/CN2021/093878, filed on May 14, 2021.

(30) Foreign Application Priority Data

May 15, 2020 (CN) .......................... 202010414583.8

(51) Int. Cl.
*H04L 51/07* (2022.01)
*G06F 3/0481* (2022.01)
(Continued)

(52) U.S. Cl.
CPC ............ *H04L 51/07* (2022.05); *G06F 3/0481* (2013.01); *G06F 3/0484* (2013.01); *G06F 9/451* (2018.02); *H04L 51/216* (2022.05)

(58) Field of Classification Search
CPC ...... G06F 3/0481; G06F 3/0484; G06F 9/451; H04L 51/07; H04L 51/216
See application file for complete search history.

(56) References Cited

U.S. PATENT DOCUMENTS 9,406,103 B1 * 8/2016 Gray ..................... G06F 3/0482
2009/0222748 A1 * 9/2009 Lejeune ................. G06F 1/169
715/764
(Continued)

FOREIGN PATENT DOCUMENTS

CN 105988657 A 10/2016
CN 106325671 A 1/2017
(Continued)

OTHER PUBLICATIONS

Anonymous, "Smart Mehtod[sic] of Managing Notification on Mobile Device," retrieved from IP.com, published on Mar. 21, 2016. (Year: 2016).*

(Continued)

*Primary Examiner* — Eric J. Bycer
(74) *Attorney, Agent, or Firm* — Astute IP Law Group

(57) ABSTRACT

The present disclosure provides a method and apparatus for displaying an interactive message for an application, and a readable storage medium. and the method includes: displaying content corresponding to a content viewing operation for a user through a display interface of an application APP when the content viewing operation input by the user is received; displaying an interactive message in a preset region of the display interface when the interactive message is received; and displaying a reply box of the interactive message on the display interface to receive a reply message for the interactive message when a first vertical sliding trigger operation for the preset region is acquired.

17 Claims, 7 Drawing Sheets

(51) Int. Cl.
  *G06F 3/0484* (2022.01)
  *G06F 9/451* (2018.01)
  *H04L 51/216* (2022.01)

(56) References Cited

U.S. PATENT DOCUMENTS

| | | | | |
|---|---|---|---|---|
| 2009/0249247 | A1* | 10/2009 | Tseng | G06F 3/0481 |
| | | | | 715/835 |
| 2012/0047460 | A1* | 2/2012 | McCann | G06F 3/04812 |
| | | | | 715/814 |
| 2012/0198002 | A1* | 8/2012 | Goulart | H04L 51/56 |
| | | | | 709/206 |
| 2013/0159417 | A1* | 6/2013 | Meckler | H04L 67/535 |
| | | | | 709/204 |
| 2014/0341744 | A1* | 11/2014 | Cazuc | F02K 1/827 |
| | | | | 416/223 A |
| 2015/0350147 | A1* | 12/2015 | Shepherd | G06F 3/04842 |
| | | | | 715/752 |
| 2016/0334956 | A1* | 11/2016 | Tomino | G06F 3/0488 |
| 2017/0139557 | A1* | 5/2017 | Heo | G06F 40/103 |
| 2018/0157406 | A1* | 6/2018 | Prakash | H04M 1/7243 |
| 2018/0188935 | A1* | 7/2018 | Singh | G06F 3/04847 |
| 2019/0089796 | A1* | 3/2019 | Lewallen, Jr. | G06F 9/54 |
| 2020/0192868 | A1* | 6/2020 | McBeath | G06F 3/04842 |
| 2020/0249821 | A1* | 8/2020 | Mao | G06F 3/04817 |
| 2020/0319754 | A1* | 10/2020 | Hwang | G06F 3/0485 |
| 2021/0064317 | A1* | 3/2021 | Juenger | G09G 5/14 |
| 2021/0136025 | A1* | 5/2021 | Thall | G06F 3/0485 |

FOREIGN PATENT DOCUMENTS

| | | | |
|---|---|---|---|
| CN | 106354504 | A | 1/2017 |
| CN | 108347533 | A | 7/2018 |
| CN | 108920059 | A | 11/2018 |
| CN | 109460174 | A | 3/2019 |
| CN | 109491567 | A | 3/2019 |
| CN | 109587322 | A | 4/2019 |
| CN | 110445706 | A | 11/2019 |
| CN | 110493448 | A | 11/2019 |

OTHER PUBLICATIONS

International Search Report and Written Opinion in PCT/CN2021/093878, mailed on Jun. 24, 2021.
Extended European Search Report in EP21803957.6, mailed Aug. 10, 2023, 10 pages.
Anonymous: "HTC Desire 520 (Cricket)—Notifications panel—Support | HTC United States", XP093154563, Available online at: <https://web.archive.org/web/20170809051722/https://www.htc.com/us/support/htc-desire-520-cricket/howto/663975.html>, Aug. 9, 2017, 2 pages.
Mark Kashman, "Share Point mobile notifications keep you up-to-date", XP093154598, Available online at: <https://techcommunity.microsoft.com/t5/microsoft-sharepoint-blog/sharepoint-mobile-notifications-keep-you-up-to-date/bc-p/128792>, Oct. 22, 2017, 20 pages.
Office Action for European Patent Application No. 21803957.6, mailed Apr. 29, 2024, 10 pages.

* cited by examiner

METHOD AND APPARATUS FOR DISPLAYING INTERACTION MESSAGE FOR APPLICATION, AND READABLE STORAGE MEDIUM

This application is a continuation of International Application No. PCT/CN2021/093878 filed on May 14, 2021, which claims the priority to and benefits of Chinese Patent Application No. 202010414583.8, filed on May 15, 2020. All the aforementioned patent applications are hereby incorporated by reference in their entireties.

TECHNICAL FIELD

Embodiments of the present disclosure relate to a field of computer technology, and more particularly, to a method and apparatus for displaying an interactive message for an application, and a readable storage medium.

BACKGROUND

At present, in a process when a user uses a content-providing Application (APP), the APP will display a received private message on a current page only when a friend's private message is received; however, in the case where other types of interactive messages (e.g., comments, @messages, likes, new friends) are received, if the user wants to view these interactive messages, the user has to go to a dedicated interactive message display page to view these interactive messages.

SUMMARY

The content of the present disclosure is provided so as to introduce the concept in a brief form, which will be described in detail in specific implementations below. The content of the present disclosure is not intended to identify key or necessary features of the claimed technical solution, nor is it intended to be used to limit the scope of the claimed technical solution required.

In a first aspect, the embodiments of the present disclosure provide a method for displaying an interactive message for an application, which includes:
displaying content corresponding to a content viewing operation for a user through a display interface of the application when the content viewing operation input by the user is received;
displaying an interactive message in a preset region of the display interface when the interactive message is received; and
displaying a reply box of the interactive message on the display interface to receive a reply message for the interactive message when a first vertical sliding trigger operation for the preset region is acquired.

In a second aspect, the embodiments of the present disclosure provide an apparatus for displaying an interactive message for an application, which includes:
a content display module, which is configured to display content corresponding to a content viewing operation for a user through a display interface of the application when the content viewing operation input by the user is received;
an interactive message display module, which is configured to display an interactive message in a preset region of the display interface when the interactive message is received; and
a reply box display module, which is configured to display a reply box of the interactive message on the display interface to receive a reply message for the interactive message when a first vertical sliding trigger operation for the preset region is acquired.

In a third aspect, the embodiments of the present disclosure provide an electronic device, which includes a memory and a processor;
a computer program is stored in the memory; and
the processor is configured to execute the computer program to implement the method provided by the embodiment in the first aspect.

In a fourth aspect, the embodiments of the present disclosure provide a computer-readable storage medium, a computer program is stored in the computer-readable storage medium, and the computer program, when executed by a processor, implements the method provided by the embodiment in the first aspect.

BRIEF DESCRIPTION OF THE DRAWINGS

In order to clearly illustrate the technical solution of the embodiments of the present disclosure, the drawings to be used in description of the embodiments will be briefly described in the following.

DETAILED DESCRIPTION

Figure 1:
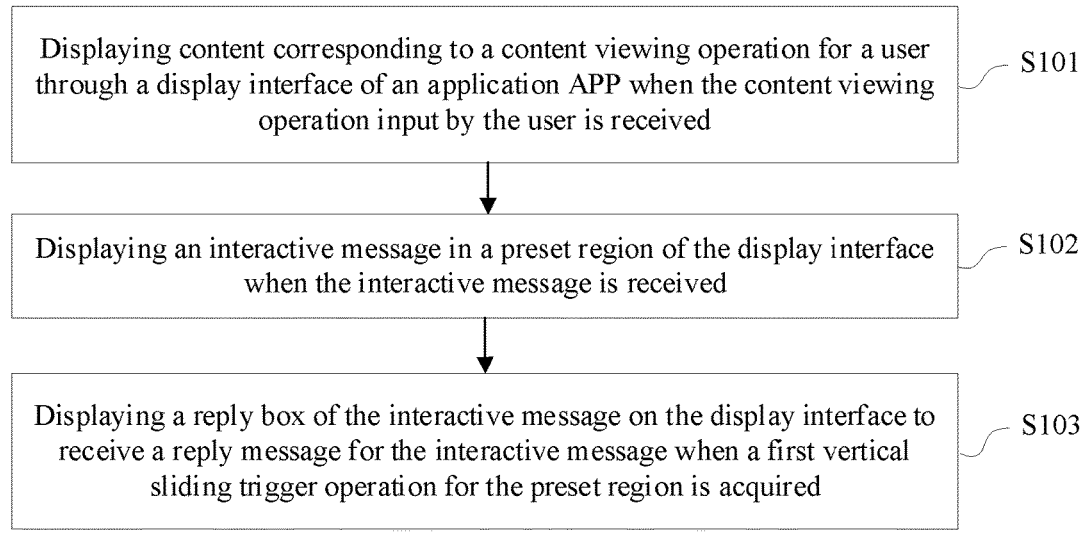
FIG. 1 is a schematic flow chart of a method for displaying an interactive message for an application provided by the embodiments of the present disclosure.

Embodiments of the present disclosure are described in detail below, examples of which are illustrated in the drawings, and the same or similar reference numerals refer to the same or similar elements or elements having the same or similar functions throughout. The embodiments described below with reference to the drawings are exemplary and are only used to explain the present disclosure, but not to be interpreted as a limitation of the present disclosure.

It may be understood by those skilled in the art that the singular forms "a", "an", "one", and "the" as used herein may also include the plural forms, unless specifically stated. It should be further understood that the terms "comprising" and "including" used in the specification of the present disclosure refers to the presence of the features, integers, steps, operations, elements and/or components, but does not preclude the presence or addition of one or more other features, integers, steps, operations, elements, components and/or groups thereof. It should be understood that when an element is referred to as being "connected" or "coupled" to another element, the element may be directly connected or coupled to another element, or one or more intermediate elements may be interposed therebetween. Furthermore, "connected" or "coupled" as used herein may include wirelessly connected or wirelessly coupled. As used herein, the term "and/or" includes all or any unit and all combination of one or more associated listed items.

In an existing mode of displaying an interactive message, a user cannot be timely prompted when the user receives an interactive message, and it is further inconvenient for the user to handle the interactive message, which reduces timeliness and convenience of interaction between the user and friends of the user.

In a method for displaying an interactive message for an application provided by the embodiments of the present disclosure, in the case where the user uses the APP to view content, when the user receives an interactive message sent by another user, the interactive message is displayed in a preset region of a display interface to prompt the user, and the user may call up a reply box through a first vertical sliding operation to reply, which ensures timeliness and convenience of interaction between users without interrupting the user's normal viewing of the current content, and improves user experience.

In order to make objectives, technical details and advantages of the present disclosure apparent, the implementations of the present disclosure will be further described in detail below in conjunction with the drawings.

FIG. 1 is a schematic flow chart of a method for displaying an interactive message for an application provided by the embodiments of the present disclosure, an executing subject of the method may be an APP, and the method may include:

step 101: displaying content corresponding to a content viewing operation for a user through a display interface of an application APP when the content viewing operation input by the user is received.

Specifically, when a user needs to view the content provided by the APP, the user enters the content viewing operation, that is, sends an instruction to view the content, and the APP displays content corresponding to the instruction through the display interface in response to the instruction. For example, in a certain short video APP, the user may view relevant short video content by entering a specified page, then an operation sent by the user to enter the specified page may be understood as the content viewing operation, and the relevant short video content displayed on the display interface of the APP is the content corresponding to the content viewing operation.

Step 102: displaying an interactive message in a preset region of the display interface when the interactive message is received.

The interactive message is generally a message sent among respective users for interactive communication. For example, in a certain short video APP, user A and user B are friends, and user A may send a private message to user B through a private message function; when user A sees a certain short video, user A may @ user B when commenting on the short video, and user B will receive an @ message sent by user A; when viewing a short video uploaded to the APP by user B, user A may comment on and/or like the short video, and user B will receive a comment message and/or a like message sent by user A; user A wants to establish a friend relationship with user B and sends a friend request to user B, user B will receive a new friend message sent by user A; the private message, the @ message, the comment message, the like message and the new friend message above sent by user A are all interactive messages, and user B may reply to these messages to achieve interaction with user A.

Specifically, when the user is viewing corresponding content through a user interface, that is, the APP is running, there is another user sending an interactive message to the user; in order to let the user know that the interactive message is received without affecting viewing of the corresponding content, the interactive message is displayed in a preset region of the user interface. A size, a shape and a position of the preset region in the user interface may be set according to actual needs, and a principle of setting the above-mentioned characteristics of the preset region may play a role of prompting the user that the interactive message is received without affecting the user's viewing of relevant content. For example, in a certain short video APP, if the user receives a comment message sent by a friend when viewing a short video, then the comment message will be displayed on the top of the display interface in a form of a rectangular banner. When the display interface displays the rectangular banner, the user may know that the comment message of the friend has been received; because the rectangular banner does not cover main content of the short video being viewed, it does not affect viewing the short video. The region where the rectangular banner is located is the corresponding preset region.

Step 103: displaying a reply box of the interactive message on the display interface to receive a reply message for the interactive message when a first vertical sliding trigger operation for the preset region is acquired.

Specifically, when the user sees the interactive message displayed in the preset region of the user interface, the user knows that the interactive message from other user has been received; in order to timely interact with the other user, the user may call up the reply box of the interactive message through the first vertical sliding trigger operation, and further input reply message in the reply box and send the reply message to the other user. When the user performs the first vertical sliding trigger operation, that is, sends an instruction to display the reply box of the interactive message, and a sliding direction of the first vertical sliding trigger operation may be downward, which is commonly referred to as a pull-down trigger operation.

It should be noted that some interactive messages include more content (e.g., private messages or comment messages), which cannot be fully displayed in the preset region, that is, the content of the interactive message is not fully displayed in the preset region. After the reply box is called up through the first vertical sliding trigger operation, full content of the interactive message is displayed without considering coverage of sliding message display on the content being viewed.

Figure 2:
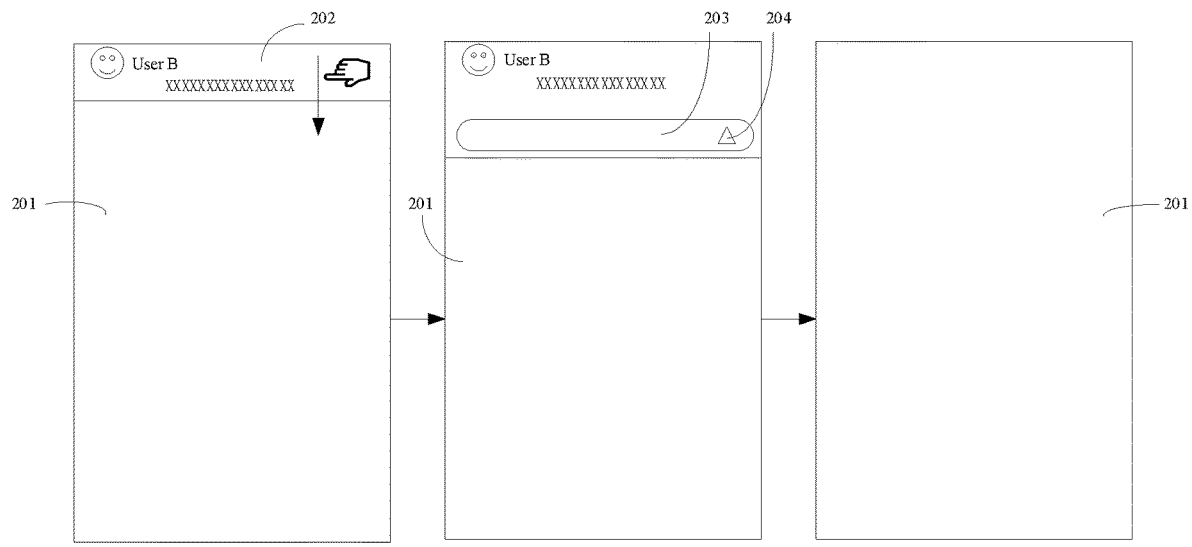
FIG. 2 is a schematic diagram of calling up an interactive message reply box by pulling down a banner in an example provided by the embodiments of the present disclosure.

For example, user A receives a private message sent by user B when viewing a short video by using a certain short video APP, as shown in FIG. 2; in a left diagram of FIG. 2, the private message is displayed in a form of a rectangular banner 202 on the top of a display interface 201 of the short video APP. When user A sees the private message and wants to reply immediately, user A may pull down the rectangular banner 202 (corresponding to the first vertical sliding trigger operation) to call up the reply box 203, as shown in a middle diagram of FIG. 2. User A may complete reply by clicking a "Send" button 204 after entering the reply message. After the user replies to the interactive message, the interactive message will disappear and no longer be displayed, as shown in a right diagram of FIG. 2.

In the solution provided by the present disclosure, in the case where the user uses the APP to view content, when the user receives an interactive message sent by another user, the interactive message is displayed in a preset region of a display interface to prompt the user, and the user may call up a reply box through a first vertical sliding operation to reply, which ensures timeliness and convenience of interaction between users without interrupting the user's normal viewing of the current content, and improves user experience.

In an optional embodiment of the present disclosure, the method may further include:

hiding the preset region when a second vertical sliding trigger operation for the preset region is acquired, and a first vertical direction of the first vertical sliding trigger operation and a second vertical direction of the second vertical sliding trigger operation are opposite directions.

Specifically, after the user knows that the interactive message sent by another user has been received, the user may not want to immediately reply to the interactive message, or may consider it unnecessary to reply to the interactive message, then the user may close display of the interactive message through the second vertical sliding trigger operation, that is, hide the preset region. In order to increase smoothness of the user's sliding operation, the first vertical direction and the second vertical direction are set in opposite directions. For example, the first vertical direction is set as a vertical down direction, and the second vertical direction is set as a vertical up direction, that is, the user calls up the reply box of the interactive message through a pull-down operation and closes display of the interactive message through a slide-up operation.

Figure 3:
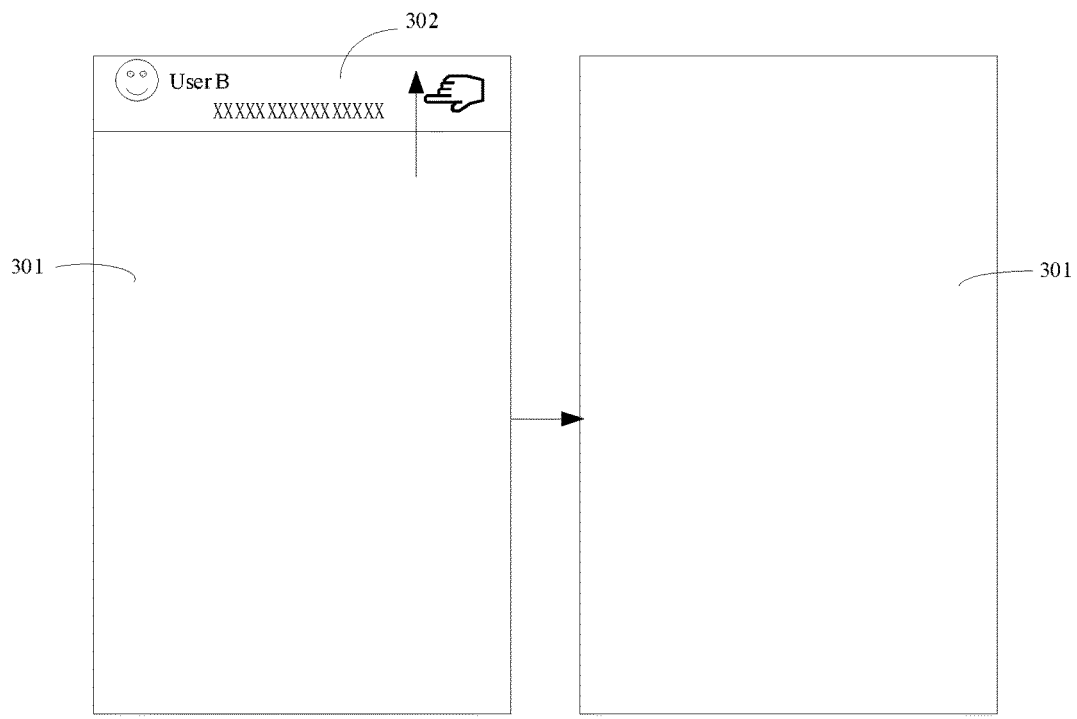
FIG. 3 is a schematic diagram of closing interactive message display by sliding up the banner in an example provided by the embodiments of the present disclosure.

For example, as shown in FIG. 3, a private message is displayed in a form of a rectangular banner 302 in a preset region of a display interface 301 of a certain short video APP; if the user does not want to reply to the private message in a timely manner, the user may close display of the comment message through the slide-up operation (corresponding to the second vertical sliding trigger operation).

In an optional embodiment of the present disclosure, displaying the interactive message in the preset region of the display interface includes:

in the preset region, displaying at least one of: a user name of a sender corresponding to the interactive message, an avatar of the sender, a message type of the interactive message, or content of the interactive message.

Specifically, in order to let the user know relevant information of the received interactive message, at least one of the user name of the sender, the avatar of the sender, the message type of the interactive message, and the content of the interactive message corresponding to the interactive message may be displayed in the preset region. A source of the interactive message may be known through the user name or avatar of the sender, and the relevant information of the interactive message may be known through the type or content of the interactive message.

Figure 4A:
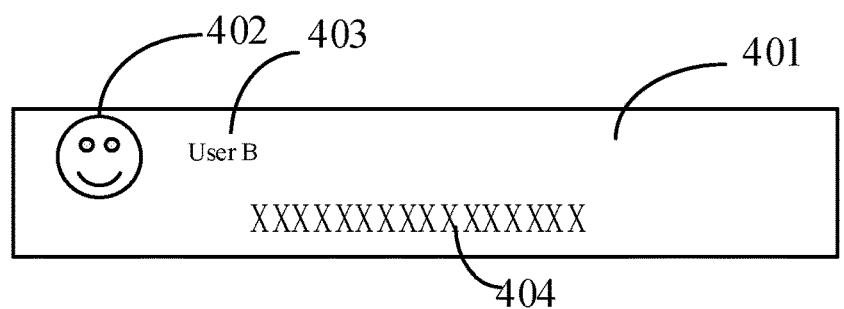
FIG. 4A is a schematic diagram of displaying a private message in an example provided by the embodiments of the present disclosure.
Figure 4B:
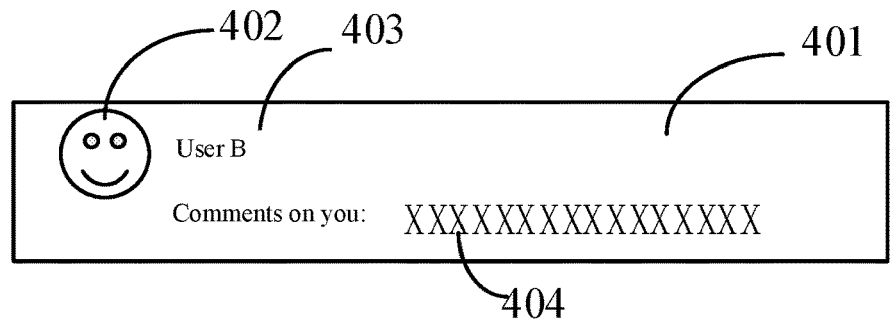
FIG. 4B is a schematic diagram of displaying a comment message in an example provided by the embodiments of the present disclosure.
Figure 4C:
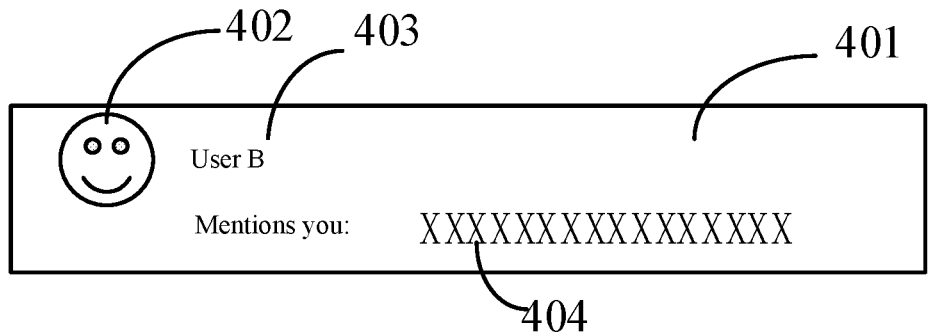
FIG. 4C is a schematic diagram of displaying an @ message in an example provided by the embodiments of the present disclosure.
Figure 4D:
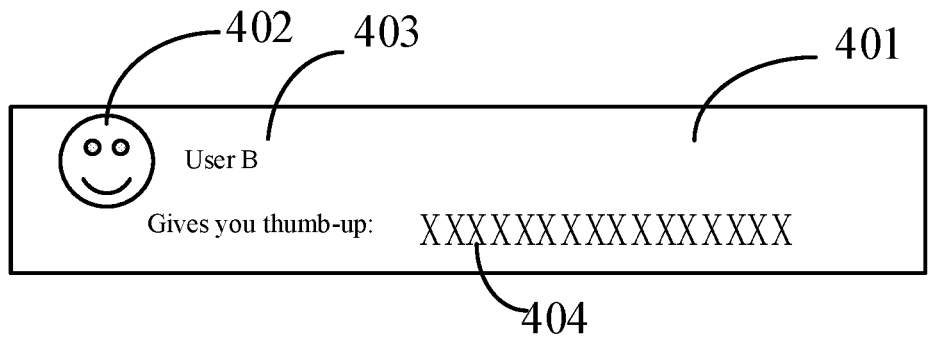
FIG. 4D is a schematic diagram of displaying a like message in an example provided by the embodiments of the present disclosure.
Figure 4E:
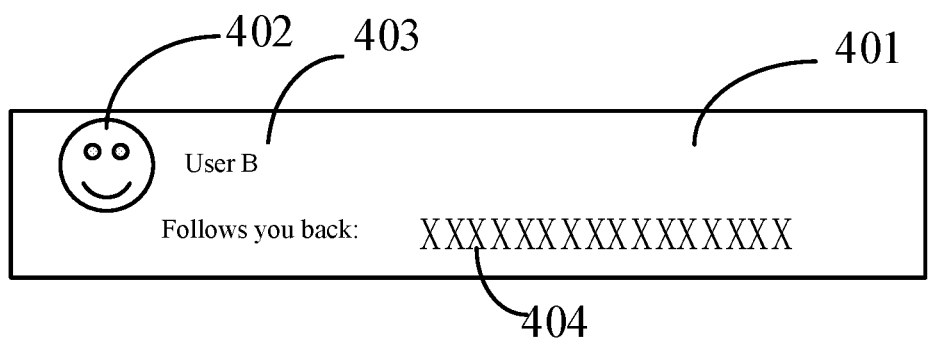
FIG. 4E is a schematic diagram of displaying a new friend message in an example provided by the embodiments of the present disclosure.

For example, display effects of various interactive messages sent by user B of a certain short video APP in the preset region are shown in FIG. 4A to FIG. 4E. Specifically, as shown in FIG. 4A, which is a private message sent by user B, and an avatar 402 of user B, a user name 403 of user B, and content 404 of the interactive message are displayed in a preset region 401. As shown in FIG. 4B, which is a comment message of user B, and the avatar 402 of user B, the user name 403 of user B, and the content 404 of the interactive message are displayed in the preset region 401; the user may determine the type of the interactive message as a comment message through "comments on you" at the beginning of the sentence in the content 404 of the interactive message. As shown in FIG. 4C, which is an @ message of user B, and the avatar 402 of user B, the user name 403 of user B, and the content 404 of the interactive message are displayed in the preset region 401; the user may determine the type of the interactive message as an @ message through "mentions you" at the beginning of the sentence in the content 404 of the interactive message. As shown in FIG. 4D, which is a like message of the user, and the avatar 402 of user B, the user name 403 of user B, and the content 404 of the interactive message are displayed in the preset region 401; the user may determine the type of the interactive message as a like message through "gives you thumb-up" at the beginning of the sentence in the content 404 of the interactive message. As shown in FIG. 4E, which is a new friend message of user B, and the avatar 402 of user B, the user name 403 of user B, and the content 404 of the interactive message are displayed in the preset region 401; the user may determine the type of the interactive message as a new friend message through "follows you back" at the beginning of the sentence in the content 404 of the interactive message.

In an optional embodiment of the present disclosure, if at least two interactive messages are received, displaying the interactive message in the preset region of the display interface includes:

displaying the last received interactive message in the at least two interactive messages in the preset region of the display interface.

Specifically, in the case where a user receives a plurality of interactive messages sent by other users while viewing relevant content, in order not to affect the user's viewing of the relevant content, always only one interactive message is displayed in the preset region of the display interface, which is the last received interactive message by default, that is, the latest interactive message.

In an optional embodiment of the present disclosure, the at least two interactive messages are sequentially arranged in an order of sending time to form a horizontal queue, and the method may further include:

switching from a currently displayed interactive message to a display of a previous interactive message of the currently displayed interactive message in the horizontal queue when a first horizontal sliding trigger operation for the preset region is acquired; and switching from the currently displayed interactive message to a display of a next interactive message of the currently displayed interactive message in the horizontal queue when a second horizontal sliding trigger operation for the preset region is acquired.

The first horizontal direction of the first horizontal sliding trigger operation and the second horizontal direction of the second horizontal sliding trigger operation are opposite directions.

Specifically, in the case where a user receives a plurality of interactive messages sent by other users while viewing relevant content, in order not to affect the user's viewing of the relevant content, always only the latest interactive message is displayed in the preset region of the display interface. When the user needs to view or reply to other interactive message, it may switch to display other interactive message through a horizontal sliding trigger operation. Specifically, the plurality of interactive messages form a horizontal queue arranged in a chronological order, then the latest interactive message is displayed by default, that is, the interactive message arranged at the tail of the horizontal queue is displayed. Through the first horizontal sliding trigger operation, it may switch to display a previous interactive message of the interactive message currently displayed, until switch to an interactive message arranged at the head in the horizontal queue, so that it may no longer switch to display through the first horizontal trigger operation. Through the second horizontal sliding trigger operation, it may switch to display a next interactive message of the interactive message currently displayed, until switch to an interactive message arranged at the tail in the horizontal queue, so that it may no longer switch to display through the second horizontal trigger operation. In order to increase smoothness of the user's sliding operation, the first horizontal direction and the second horizontal direction are set in opposite directions. For example, the first horizontal direction is set to a horizontal right direction, and the second horizontal direction is set to a horizontal left direction, that is, the user may switch from the interactive message currently displayed to the previous interactive message by sliding right, and may switch from the interactive message currently displayed to the next interactive message by sliding left.

Figure 5A:
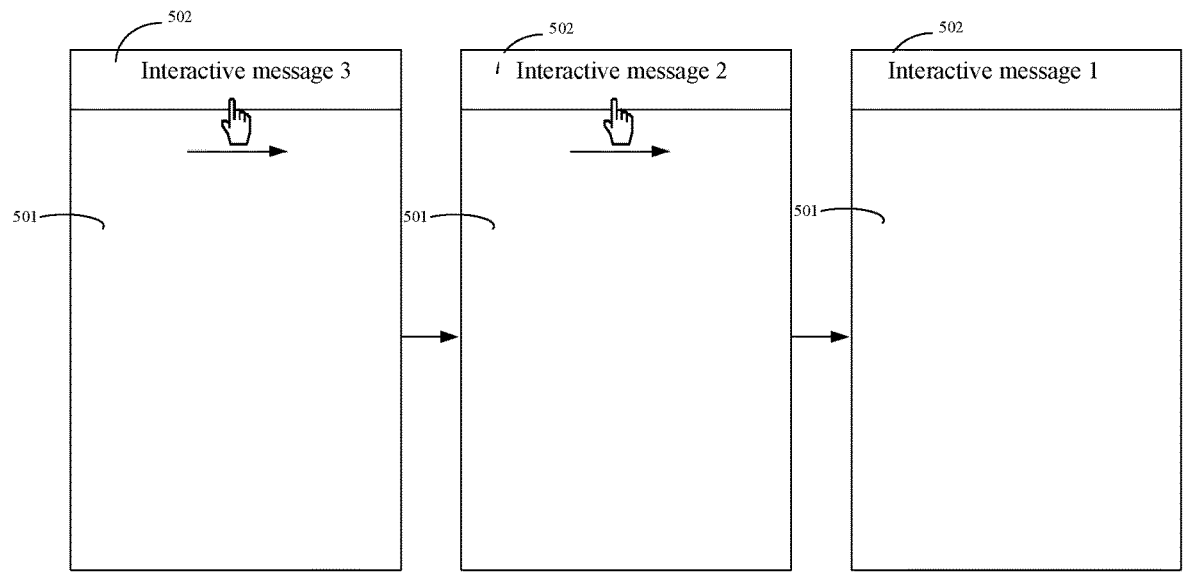
FIG. 5A is a schematic diagram of switching to display a plurality of interactive messages by sliding right in an example provided by the embodiments of the present disclosure.
Figure 5B:
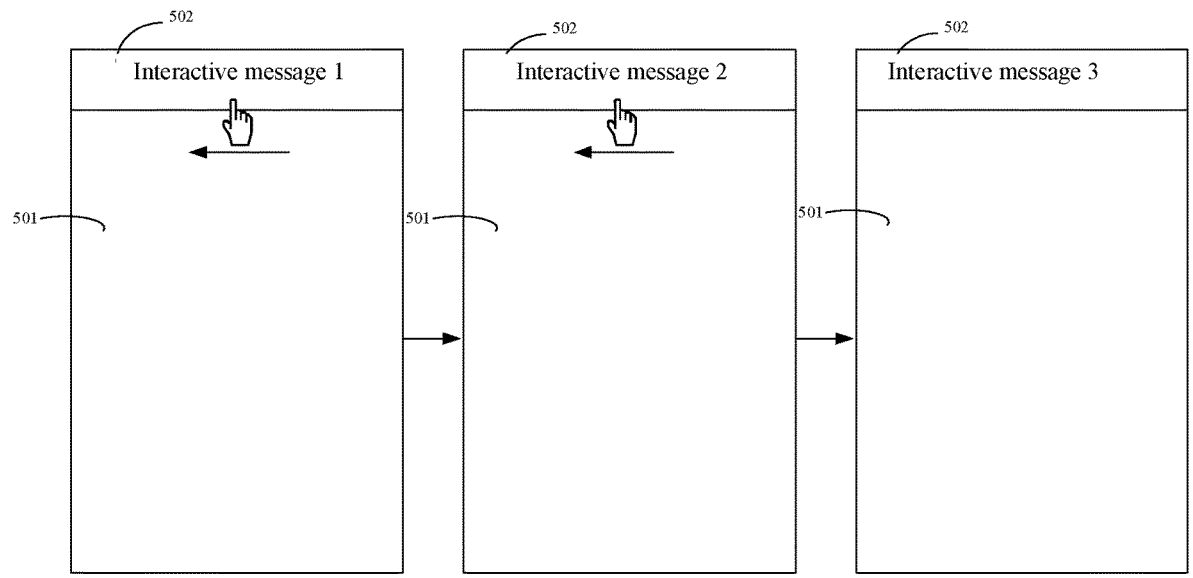
FIG. 5B is a schematic diagram of switching to display a plurality of interactive messages by sliding left in an example provided by the embodiments of the present disclosure.

For example, in a certain short video APP, the user successively receives interactive message 1, interactive message 2, and interactive message 3 when viewing a short video, that is, interactive message 1, interactive message 2, and interactive message 3 may form a horizontal queue, and interactive message 1 is at the head of the horizontal queue, interactive message 2 is in the middle of the horizontal queue, and interactive message 3 is at the tail of the horizontal queue. As shown in FIG. 5A, the display interface 501 displays the last received interactive message 3 by default; the user switches to interactive message 2 (the previous interactive message of interactive message 3) by sliding a banner 502 to the right once, and then switches to interactive message 1 (the previous interactive message of interactive message 2) by sliding the banner 502 to the right once again; at this time, the user can no longer switch the interactive message by sliding to the right. As shown in FIG. 5B, the display interface 501 currently displays interactive message 1; the user switches to interactive message 2 (the next interactive message of interactive message 1) by sliding the banner 502 to the left once, and then switches to interactive message 3 (the next interactive message of interactive message 2) by sliding the banner 502 to the left once again; at this time, the user can no longer switch the interactive message by sliding to the left. Of course, it may be understood that if the interactive message currently displayed on the display interface 501 is interactive message 2, the user may switch to interactive message 1 by sliding the banner 502 to the right once, or may switch to interactive message 3 by sliding the banner 502 to the left once.

In an optional embodiment of the present disclosure, the interactive message includes an interactive message with associated content and an interactive message without associated content, and the method may further include:

jumping to display associated content corresponding to the interactive message with associated content when a detail viewing trigger operation for the interactive message with associated content is acquired; and jumping to display an interactive message list page when a detail viewing trigger operation for the interactive message without associated content is acquired.

The interactive message with associated content may be understood as an interactive message based on specific associated content, for example, the @ message may be a message @ the user, when another user is forwarding or commenting certain content, then the content is the associated content, and the @ message is an interactive message with associated content; the comment message may be that another user comments on certain content uploaded by the user, then the content is the associated content, and the comment message is an interactive message with associated content; the like message may be that another user likes certain content uploaded by the user, then the content is the associated content, and the like message is an interactive message with associated content. An interactive message without associated content may be understood as an interactive message not based on any specific associated content, for example, a new friend message or a private message, etc.

Specifically, in the case where the interactive message currently displayed on the display interface is an interactive message with associated content, if the detail viewing trigger operation for the interactive message currently displayed is acquired, it jumps to and displays the associated content corresponding to the interactive message. In the case where the interactive message currently displayed on the display interface is an interactive message without associated content, if the detail viewing trigger operation for the interactive message currently displayed is acquired, because the interactive message currently displayed is not provided with corresponding associated content, it jumps to the interactive message list page by default, and the user can view detail information of all interactive messages on the interactive message list page. The detail viewing trigger operation may be a click operation or a long press operation for the preset region.

Figure 6A:
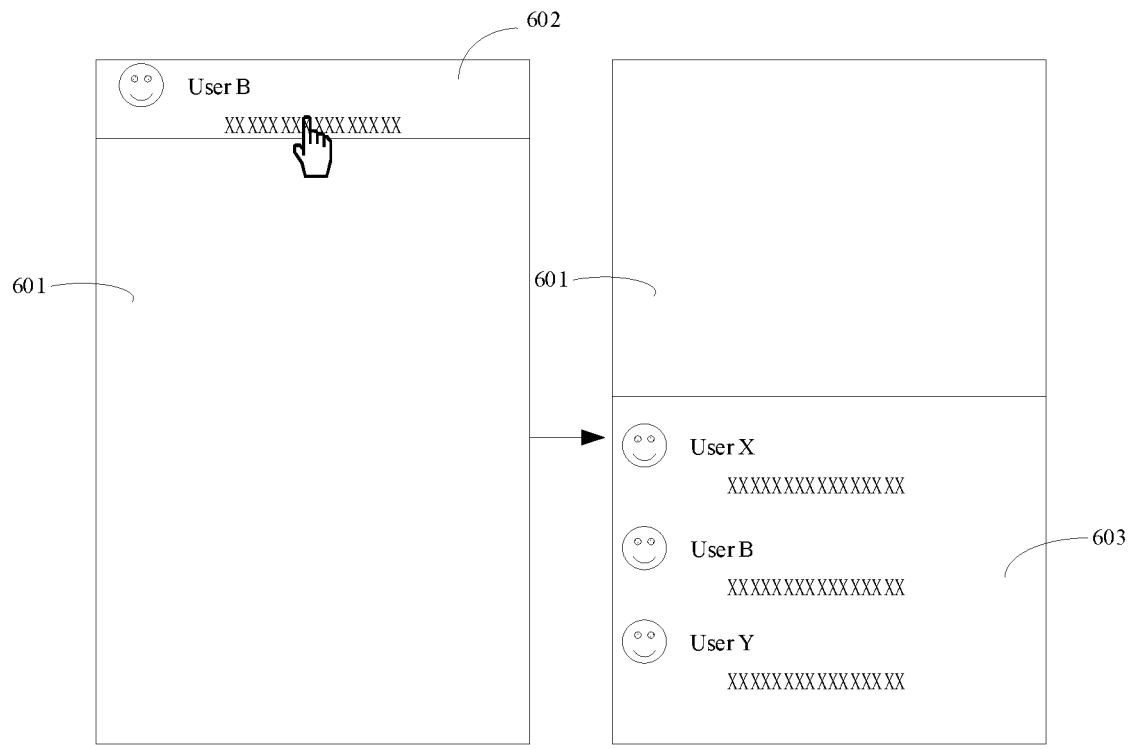
FIG. 6A is a schematic diagram of jumping to display associated content by clicking a banner of a comment message in an example provided by the embodiments of the present disclosure.
Figure 6B:
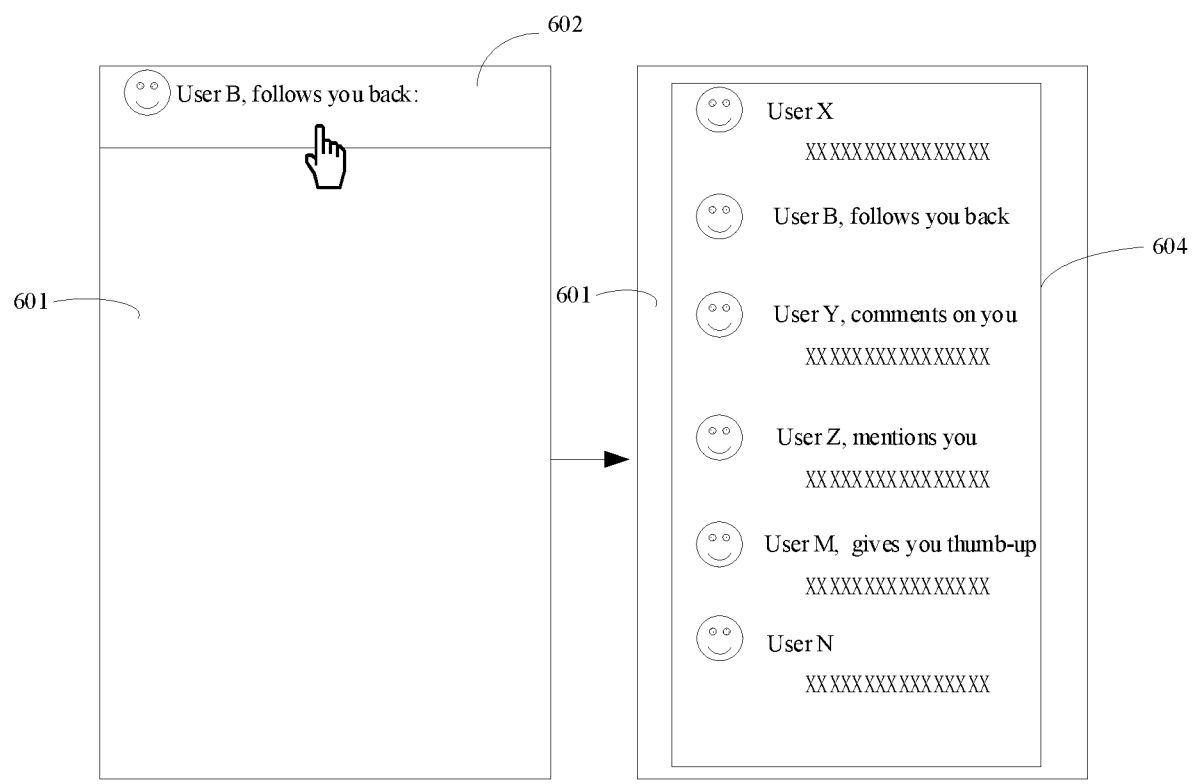
FIG. 6B is a schematic diagram of jumping to display an interactive message list page by clicking a banner of a new friend message in an example provided by the embodiments of the present disclosure.

For example, as shown in FIG. 6A, an interactive message currently displayed on a display interface 601 of a certain short video APP is a comment message (corresponding to an interactive message with associated content), and the comment message is received after user B comments on a certain short video uploaded by user A; when the user clicks a banner 602, it jumps to and displays the short video, and displays a comment page 603 of the short video, and the comment page 603 displays details of user B's comments on the short video. As shown in FIG. 6B, an interactive message currently displayed on the display interface 601 is a new friend message (corresponding to an interactive message without associated content), and when the user clicks the banner 602, it jumps to and displays an interactive message list page 604.

In an optional embodiment of the present disclosure, the method further includes:

if at least two interactive messages are received during a period when the APP is not running, displaying the at least two interactive messages in aggregate in the preset region when the APP is rerunning; and displaying the last received interactive message in the at least two interactive messages in the preset region when a detail viewing trigger operation for the at least two interactive messages is acquired.

Specifically, the rerunning of the APP refers to that the APP changes from a non-running state to a running state. For example, the APP being re-opened after the user exits the APP is the rerunning of the APP. When the user does not use the APP, the user may miss viewing the interactive messages sent by other users in a timely manner. Therefore, when the APP is re-opened, a plurality of interactive messages will be aggregately displayed in the preset region of the display interface to prompt the user. When the detail viewing trigger operation for at least two interactive messages is acquired, in order not to affect the user's viewing of relevant content, the last received interactive message among the plurality of interactive messages is displayed in the preset region of the display interface. In addition, when the detail viewing trigger operation for at least two interactive messages is acquired, it jumps to display the interactive message list page for the user to view and process the at least two interactive messages.

It may be understood that for a plurality of interactive messages, the switching display between the respective interactive messages may be performed in the manner described in the above-mentioned embodiments; it is also possible to call up the corresponding reply box or close display of the interactive messages currently displayed on the display interface in the manner described in the above-mentioned embodiments; and the interactive messages currently displayed on the display interface may also be jumped to display in the manner described in the above-mentioned embodiments. Specifically, the switching display between the respective interactive messages may be realized through the first horizontal sliding trigger operation and the second horizontal sliding trigger operation; the reply box of the interactive message currently displayed may be called up through the first vertical sliding trigger operation, and the interactive message currently displayed may be closed through the second vertical sliding operation; and the associated content or the interactive message list page corresponding to the interactive message currently displayed may be jumped to display through the detail viewing trigger operation for the interactive message currently displayed.

In an optional embodiment of the present disclosure, displaying the at least two interactive messages in aggregate in the preset region includes:

aggregating the respective interactive messages according to the message type, and displaying respective message types, and user names and avatars of senders corresponding to the respective message types in the preset region.

Figure 7:
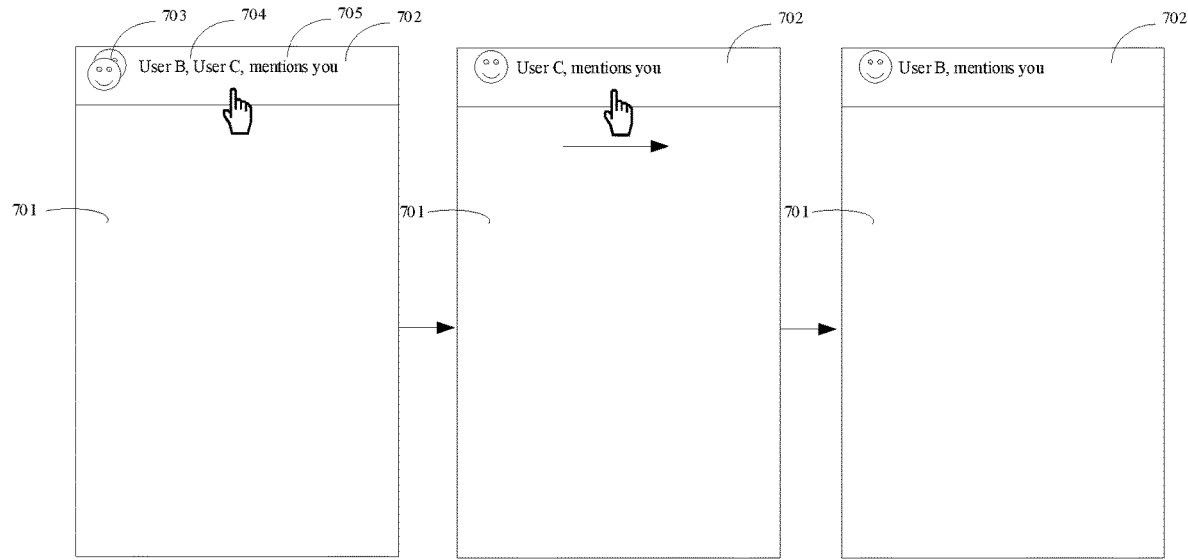
FIG. 7 is a schematic diagram of aggregately displaying a plurality of interactive messages in an example provided by the embodiments of the present disclosure.

For example, when a certain short video APP is not running, @ messages sent by user B and user C are received, and user B sends the @ message before user C. As shown in FIG. 7, when the user opens the short video APP, that is, the short video APP is rerunning, the two @ messages sent by user B and user C are aggregately displayed in a banner 702 of a display interface 701. Specifically, in a left diagram of FIG. 7, avatars (703) of user B and user C, user names (704) of user B and user C, and message types of the two interactive messages are aggregately displayed in the banner 702 (the message type of the interactive message may be determined as @ message by "mentions you" (705)). When the user clicks the banner 702, the two @ messages displayed aggregately are scattered, and the last received @ message, i.e., the @ message sent by user C, is displayed in the banner 702, as shown in a middle diagram of FIG. 7. When the user slides the banner 702 to the right, the @ message sent by user C switches to the @ message sent by user B in the banner 702, as shown in a right diagram of FIG. 7. It may be understood that for the middle diagram of FIG. 7, the banner 702 may also be slid up to close the interactive message, or the banner 702 may also be pulled down to call up the reply box of the interactive message, or the banner 702 may also be clicked to jump to and display the short video corresponding to the @ message.

Figure 8:
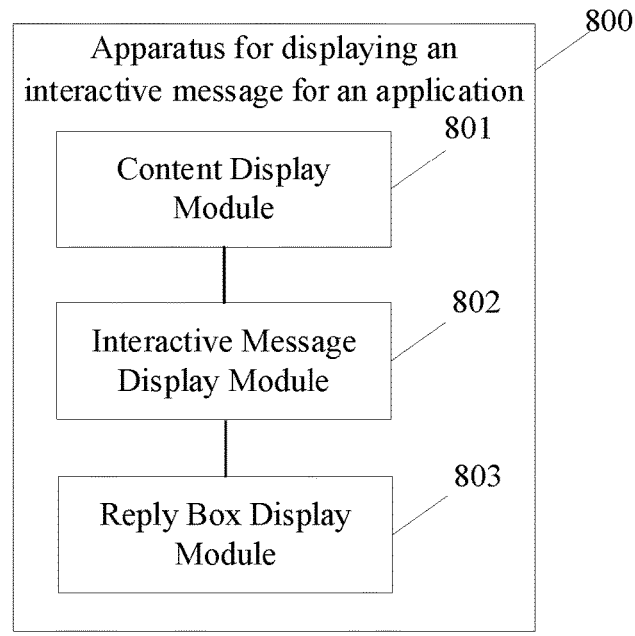
FIG. 8 is a schematic diagram of a structure of an apparatus for displaying an interactive message for an application provided by the embodiments of the present disclosure.

FIG. 8 is a schematic diagram of a structure of an apparatus for displaying an interactive message for an application provided by the embodiments of the present disclosure, and the apparatus 800 includes a content display module 801, an interactive message display module 802, and a reply box display module 803.

The content display module 801 is configured to display content corresponding to a content viewing operation for a user through a display interface of an APP when the content viewing operation input by the user is received.

The interactive message display module 802 is configured to display an interactive message in a preset region of the display interface when the interactive message is received.

The reply box display module 803 is configured to display a reply box of the interactive message on the display interface to receive a reply message for the interactive message when a first vertical sliding trigger operation for the preset region is acquired.

In the solution provided by the embodiments of the present disclosure, in the case where the user uses the APP to view content, when the user receives an interactive message sent by another user, the interactive message is displayed in a preset region of a display interface to prompt the user, and the user may call up a reply box through a first vertical sliding operation to reply, which ensures timeliness and convenience of interaction between users without interrupting the user's normal viewing of the current content, and improves user experience.

In an optional embodiment of the present disclosure, the apparatus further includes an interactive message close module, which is configured to:

hide the preset region when a second vertical sliding trigger operation for the preset region is acquired, and a first vertical direction of the first vertical sliding trigger operation and a second vertical direction of the second vertical sliding trigger operation are opposite directions.

In an optional embodiment of the present disclosure, the interactive message display module is specifically configured to:

in the preset region, display at least one of: a user name of a sender corresponding to the interactive message, an avatar of the sender, a message type of the interactive message, or content of the interactive message.

In an optional embodiment of the present disclosure, if at least two interactive messages are received, the interactive message display module is specifically configured to:

display the last received interactive message in the at least two interactive messages in the preset region of the display interface.

In an optional embodiment of the present disclosure, the at least two interactive messages are sequentially arranged in an order of sending time to form a horizontal queue, and the apparatus further includes an interactive message switch display module, which is configured to:

switch from a currently displayed interactive message to a display of a previous interactive message of the currently displayed interactive message in the horizontal queue when a first horizontal sliding trigger operation for the preset region is acquired; and switch from the currently displayed interactive message to a display of a next interactive message of the currently displayed interactive message in the horizontal queue when a second horizontal sliding trigger operation for the preset region is acquired.

The first horizontal direction of the first horizontal sliding trigger operation and the second horizontal direction of the second horizontal sliding trigger operation are opposite directions.

In an optional embodiment of the present disclosure, the interactive message includes an interactive message with associated content and an interactive message without associated content, and the apparatus further includes an interactive message detail viewing module, which is configured to:

jump to display associated content corresponding to the interactive message with associated content when a detail viewing trigger operation for the interactive message with associated content is acquired; and jumping to display an interactive message list page when a detail viewing trigger operation for the interactive message without associated content is acquired.

In an optional embodiment of the present disclosure, the apparatus further includes an aggregate display module, including:

an aggregate display sub-module, which is configured to, if at least two interactive messages are received during a period when the application is not running, aggregately display the at least two interactive messages in the preset region when the APP is rerunning;

an aggregate message detail viewing module, which is configured to display the last received interactive message in the at least two interactive messages in the preset region when a detail viewing trigger operation for the at least two interactive messages is acquired.

In an optional embodiment of the present disclosure, the aggregate display sub-module is specifically configured to:

aggregate the respective interactive messages according to the message type, and display respective message types, and user names and avatars of sender corresponding to the respective message types in the preset region.

Figure 9:
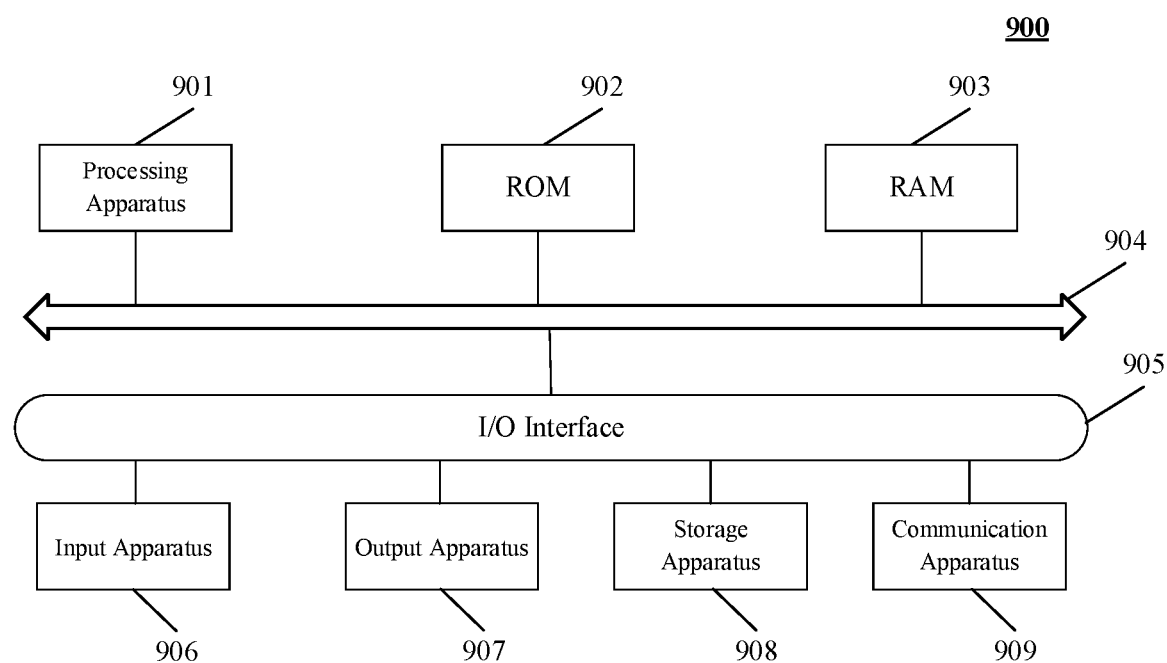
FIG. 9 is a schematic diagram of a structure of an electronic device provided by the embodiments of the present disclosure.

Referring to FIG. 9, which shows a schematic diagram of a structure suitable for implementing an electronic device 900 (e.g., a terminal device or a server that executes the method shown in FIG. 1) of the embodiments of the present disclosure. The terminal device in the embodiments of the present disclosure may include, but not limited to, mobile terminals such as a mobile phone, a notebook computer, a digital broadcasting receiver, a personal digital assistant (PDA), a portable ANDROID™ device (PAD), a portable media player (PMP), a vehicle-mounted terminal (e.g., a vehicle-mounted navigation terminal), or the like, and fixed terminals such as a digital TV, a desktop computer, or the like. The electronic device illustrated in FIG. 9 is merely an example, and should not pose any limitation to the functions and the range of use of the embodiments of the present disclosure.

The electronic device includes a memory and a processor, the processor herein may be called a processing apparatus 901 below, and the memory may include at least one of a read-only memory (ROM) 902, a random-access memory (RAM) 903, and a storage apparatus 908 below, which is specifically illustrated below.

As illustrated in FIG. 9, the electronic device 900 may include a processing apparatus 901 (e.g., a central processing unit, a graphics processing unit, etc.), which can perform various suitable actions and processing according to a program stored in a read-only memory (ROM) 902 or a program loaded from a storage apparatus 908 into a random-access memory (RAM) 903. The RAM 903 further stores various programs and data required for operations of the electronic device 900. The processing apparatus 901, the ROM 902, and the RAM 903 are interconnected by means of a bus 904. An input/output (I/O) interface 905 is also connected to the bus 904.

Usually, the following apparatus may be connected to the I/O interface 905: an input apparatus 906 including, for example, a touch screen, a touch pad, a keyboard, a mouse, a camera, a microphone, an accelerometer, a gyroscope, or the like; an output apparatus 907 including, for example, a liquid crystal display (LCD), a loudspeaker, a vibrator, or the like; a storage apparatus 908 including, for example, a magnetic tape, a hard disk, or the like; and a communication apparatus 909. The communication apparatus 909 may allow the electronic device 900 to be in wireless or wired communication with other devices to exchange data. While FIG. 9 illustrates the electronic device 900 having various apparatuses, it should be understood that not all of the illustrated apparatuses are necessarily implemented or included. More or fewer apparatuses may be implemented or included alternatively.

Particularly, according to the embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 909 and installed, or may be installed from the storage apparatus 908, or may be installed from the ROM 902. When the computer program is executed by the processing apparatus 901, the above-mentioned functions defined in the methods of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) or the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to:

display content corresponding to a content viewing operation for a user through a display interface of the APP when the content viewing operation input by the user is received; display an interactive message in a preset region of the display interface when the interactive message is received; and display a reply box of the interactive message on the display interface to receive a reply message for the interactive message when a first vertical sliding trigger operation for the preset region is acquired.

The computer program codes for performing the operations of the present disclosure may be written in one or more programming languages or a combination thereof. The above-mentioned programming languages include object-oriented programming languages such as JAVA™, SMALL-TALK™, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances, for example, the content display module can also be described as a "module that displays content".

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

One or more embodiments of the present disclosure provide a method for displaying an interactive message for an application, including:

displaying content corresponding to a content viewing operation for a user through a display interface of the application when the content viewing operation input by the user is received;

displaying an interactive message in a preset region of the display interface when the interactive message is received; and displaying a reply box of the interactive message on the display interface to receive a reply message for the interactive message when a first vertical sliding trigger operation for the preset region is acquired.

According to one or more embodiments of the present disclosure, the method further includes:

hiding the preset region when a second vertical sliding trigger operation for the preset region is acquired, and a first vertical direction of the first vertical sliding trigger operation and a second vertical direction of the second vertical sliding trigger operation are opposite directions.

According to one or more embodiments of the present disclosure, displaying the interactive message in the preset region of the display interface includes:

in the preset region, displaying at least one of: a user name of a sender corresponding to the interactive message, an avatar of the sender, a message type of the interactive message, or content of the interactive message.

According to one or more embodiments of the present disclosure, if at least two interactive messages are received, displaying the interactive message in the preset region of the display interface includes:

displaying a last received interactive message in the at least two interactive messages in the preset region of the display interface.

According to one or more embodiments of the present disclosure, the at least two interactive messages are sequentially arranged in an order of sending time to form a horizontal queue, and the method further includes:

switching from a currently displayed interactive message to a display of a previous interactive message of the currently displayed interactive message in the horizontal queue when a first horizontal sliding trigger operation for the preset region is acquired;

switching from the currently displayed the interactive message to a display of a next interactive message of the currently displayed interactive message in the horizontal queue when a second horizontal sliding trigger operation for the preset region is acquired; and a first horizontal direction of the first horizontal sliding trigger operation and a second horizontal direction of the second horizontal sliding trigger operation are opposite directions.

According to one or more embodiments of the present disclosure, the interactive message includes an interactive message with associated content and an interactive message without associated content, and the method further includes:

jumping to display associated content corresponding to the interactive message with associated content when a detail viewing trigger operation for the interactive message with associated content is acquired; and jumping to display an interactive message list page when a detail viewing trigger operation for the interactive message without associated content is acquired.

According to one or more embodiments of the present disclosure, the method further includes:

if at least two interactive messages are received during a period when the application is not running, displaying the at least two interactive messages in aggregate in the preset region when the application is rerunning; and displaying a last received interactive message in the at least two interactive messages in the preset region when a detail viewing trigger operation for the at least two interactive messages is acquired.

According to one or more embodiments of the present disclosure, displaying the at least two interactive messages in aggregate in the preset region includes:

aggregating respective interactive messages according to the message type, and displaying respective message types, and user names and avatars of senders corresponding to the respective message types in the preset region.

One or more embodiments of the present disclosure provide an apparatus for displaying an interactive message for an application, including:

a content display module, which is configured to display content corresponding to a content viewing operation for a user through a display interface of the application when the content viewing operation input by the user is received;

an interactive message display module, which is configured to display an interactive message in a preset region of the display interface when the interactive message is received; and a reply box display module, which is configured to display a reply box of the interactive message on the display interface to receive a reply message for the interactive message when a first vertical sliding trigger operation for the preset region is acquired.

According to one or more embodiments of the present disclosure, the apparatus further includes an interactive message close module, which is configured to:

hide the preset region when a second vertical sliding trigger operation for the preset region is acquired, and a first vertical direction of the first vertical sliding trigger operation and a second vertical direction of the second vertical sliding trigger operation are opposite directions.

According to one or more embodiments of the present disclosure, the interactive message display module is specifically configured to:

in the preset region, display at least one of: a user name of a sender corresponding to the interactive message, an avatar of the sender, a message type of the interactive message, or content of the interactive message.

According to one or more embodiments of the present disclosure, if at least two interactive messages are received, the interactive message display module is specifically configured to:

display the last received interactive message in the at least two interactive messages in the preset region of the display interface.

According to one or more embodiments of the present disclosure, the at least two interactive messages are sequentially arranged in an order of sending time to form a horizontal queue, and the apparatus further includes an interactive message switch display module, which is configured to:

switch from a currently displayed interactive message to a display of a previous interactive message of the currently displayed interactive message in the horizontal queue when a first horizontal sliding trigger operation for the preset region is acquired;

switch from the currently displayed interactive message to a display of a next interactive message of the currently displayed interactive message in the horizontal queue when a second horizontal sliding trigger operation for the preset region is acquired; and the first horizontal direction of the first horizontal sliding trigger operation and the second horizontal direction of the second horizontal sliding trigger operation are opposite directions.

According to one or more embodiments of the present disclosure, the interactive message includes an interactive message with associated content and an interactive message without associated content, and the apparatus further includes an interactive message detail viewing module, which is configured to:

jump to display associated content corresponding to the interactive message with associated content when a detail viewing trigger operation for the interactive message with associated content is acquired; and jumping to display an interactive message list page when a detail viewing trigger operation for the interactive message without associated content is acquired.

According to one or more embodiments of the present disclosure, the apparatus further includes an aggregate display module, including:

an aggregate display sub-module, which is configured to, if at least two interactive messages are received during a period when the APP is not running, aggregately display the at least two interactive messages in the preset region when the APP is rerunning; and an aggregate message detail viewing module, which is configured to display the last received interactive message in the at least two interactive messages in the preset region when a detail viewing trigger operation for the at least two interactive messages is acquired.

According to one or more embodiments of the present disclosure, the aggregate display sub-module is specifically configured to:

aggregate the respective interactive messages according to the message type, and display respective message types, and user names and avatars of sender corresponding to the respective message types in the preset region.

One or more embodiments of the present disclosure provide an electronic device, including a memory and a processor;

a computer program is stored in the memory; and the processor is configured to execute the computer program to implement the method according to the above-mentioned one or more embodiments.

One or more embodiments of the present disclosure provide a computer-readable storage medium, a computer program is stored in the computer-readable storage medium, and the computer program, when executed by a processor, implements the method according to the above-mentioned one or more embodiments.

The above descriptions are merely optional embodiments of the present disclosure and illustrations of the technical principles employed. Those skilled in the art should understand that the scope of disclosure involved in the present disclosure is not limited to the technical solutions formed by the specific combination of the above-mentioned technical features, and should also cover, without departing from the above-mentioned disclosed concept, other technical solutions formed by any combination of the above-mentioned technical features or their equivalents, such as technical solutions which are formed by replacing the above-mentioned technical features with the technical features disclosed in the present disclosure (but not limited to) with similar functions.

Additionally, although operations are depicted in a particular order, it should not be understood that these operations are required to be performed in a specific order as illustrated or in a sequential order. Under certain circumstances, multitasking and parallel processing may be advantageous. Likewise, although the above discussion includes several specific implementation details, these should not be interpreted as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combinations.

Although the subject matter has been described in language specific to structural features and/or method logical actions, it should be understood that the subject matter defined in the appended claims is not necessarily limited to the specific features or actions described above. Rather, the specific features and actions described above are merely example forms of implementing the claims.

The invention claimed is:

1. A method for displaying an interactive message for an application, comprising:

displaying content corresponding to a content viewing operation for a user through a display interface of the application when the content viewing operation input by the user is received;

displaying an interactive message in a preset region of the display interface when the interactive message is received, wherein the interactive message comprises an interactive message with associated content uploaded by the user and an interactive message without associated content uploaded by the user;

displaying a reply box of the interactive message on the display interface to receive a reply message for the interactive message when a first vertical sliding trigger operation for the preset region is acquired;

jumping to display associated content uploaded by the user corresponding to the interactive message with associated content uploaded by the user and a comment page of associated content uploaded by the user displaying details of comments on associated content uploaded by the user, when a detail viewing trigger operation for the interactive message with associated content uploaded by the user is acquired, wherein the associated content uploaded by the user is a short video uploaded to the application by the user; and jumping to display an interactive message list page when a detail viewing trigger operation for the interactive message without associated content uploaded by the user is acquired, and wherein the interactive message with associated content uploaded by the user comprises at least one of a tag message, a comment message, and a like message for the short video, and the interactive message without associated content uploaded by the user comprises at least one of a new friend message and a private message.

2. The method according to claim 1, further comprising:

hiding the preset region when a second vertical sliding trigger operation for the preset region is acquired, wherein a first vertical direction of the first vertical sliding trigger operation and a second vertical direction of the second vertical sliding trigger operation are opposite directions.

3. The method according to claim 2, wherein displaying the interactive message in the preset region of the display interface comprises:

in the preset region, displaying at least one of:

a user name of a sender corresponding to the interactive message, an avatar of the sender, a message type of the interactive message, or content of the interactive message.

4. The method according to claim 3, wherein when at least two interactive messages are received, displaying the interactive message in the preset region of the display interface comprises:

displaying a last received interactive message in the at least two interactive messages in the preset region of the display interface.

5. The method according to claim 4, wherein the at least two interactive messages are sequentially arranged in an order of sending time to form a horizontal queue, and the method further comprises:
switching from a currently displayed interactive message to a display of a previous interactive message of the currently displayed interactive message in the horizontal queue when a first horizontal sliding trigger operation for the preset region is acquired; and
switching from the currently displayed interactive message to a display of a next interactive message of the currently displayed interactive message in the horizontal queue when a second horizontal sliding trigger operation for the preset region is acquired,
wherein a first horizontal direction of the first horizontal sliding trigger operation and a second horizontal direction of the second horizontal sliding trigger operation are opposite directions.

6. The method according to claim 1, wherein displaying the interactive message in the preset region of the display interface comprises:
in the preset region, displaying at least one of:
a user name of a sender corresponding to the interactive message,
an avatar of the sender,
a message type of the interactive message, or
content of the interactive message.

7. The method according to claim 1, wherein when at least two interactive messages are received, displaying the interactive message in the preset region of the display interface comprises:
displaying a last received interactive message in the at least two interactive messages in the preset region of the display interface.

8. The method according to claim 1, further comprising:
when at least two interactive messages are received during a period when the application is not running, displaying the at least two interactive messages in aggregate in the preset region when the application is rerunning; and
displaying a last received interactive message in the at least two interactive messages in the preset region when a detail viewing trigger operation for the at least two interactive messages is acquired.

9. The method according to claim 8, wherein displaying the at least two interactive messages in aggregate in the preset region comprises:
aggregating respective interactive messages in the at least two interactive messages according to a message type to obtain at least one message type, and displaying, in the preset region, each message type in the at least one message type, and one or more user names and avatars of senders corresponding to the each message type.

10. The method according to claim 1, further comprising:
when at least two interactive messages are received during a period when the application is not running, displaying the at least two interactive messages in aggregate in the preset region when the application is rerunning; and
displaying a last received interactive message in the at least two interactive messages in the preset region when a detail viewing trigger operation for the at least two interactive messages is acquired.

11. The method according to claim 10, wherein displaying the at least two interactive messages in aggregate in the preset region comprises:
aggregating respective interactive messages in the at least two interactive messages according to a message type to obtain at least one message type, and displaying, in the preset region, each message type in the at least one message type, and one or more user names and avatars of senders corresponding to the each message type.

12. An electronic device, comprising a memory and a processor,
wherein a computer program is stored in the memory; and
the processor is configured to execute the computer program to implement the method according to claim 1.

13. An electronic device, comprising a memory and a processor,
wherein a computer program is stored in the memory; and
the processor is configured to execute the computer program to implement the method according to claim 5.

14. An electronic device, comprising a memory and a processor,
wherein a computer program is stored in the memory; and
the processor is configured to execute the computer program to implement the method according to claim 6.

15. A non-volatile computer-readable storage medium, wherein a computer program is stored in the computer-readable storage medium, and the computer program, when executed by a processor, implements the method according to claim 1.

16. A non-volatile computer-readable storage medium, wherein a computer program is stored in the computer-readable storage medium, and the computer program, when executed by a processor, implements the method according to claim 5.

17. A non-volatile computer-readable storage medium, wherein a computer program is stored in the computer-readable storage medium, and the computer program, when executed by a processor, implements the method according to claim 11.

\* \* \* \* \*